Dec. 2, 1941.     F. L. LE BUS     2,264,913
PIPE FISHING TOOL
Filed Feb. 7, 1939     2 Sheets-Sheet 1

Franklin L. Le Bus
INVENTOR.
BY John M. Spellman
ATTORNEY.

Dec. 2, 1941.  F. L. LE BUS  2,264,913
PIPE FISHING TOOL
Filed Feb. 7, 1939  2 Sheets-Sheet 2

Franklin L. Le Bus
INVENTOR.
BY John M. Spellman
ATTORNEY.

Patented Dec. 2, 1941

2,264,913

UNITED STATES PATENT OFFICE 2,264,913

PIPE FISHING TOOL

Franklin L. Le Bus, Longview, Tex.

Application February 7, 1939, Serial No. 254,982

3 Claims. (Cl. 294—96)

This invention relates to fishing tools and it has particular reference to a tool or spear for the retrieving of lost piping within a bore hole.

The principal object of the invention is to provide a tool by means of which lost casing or the like may be easily contacted and pulled from the well.

Another object of the invention is to provide a fishing tool having means whereby a circulating medium will have free access through the tool, thence downwardly through the pipe to be recovered and upwardly around the outer surfaces of the pipe which is to be withdrawn from the bore hole.

Still another object of the invention is to provide a fishing tool having packing means which will effectively seal off undesired liquid flow during the operation of the tool.

Yet another object of the invention is to provide a tool which may be readily attached to the operating string of pipe and which tool is provided with a slip mandrel so arranged that a "packing off" operation may be readily effected.

Still another object of the invention is to provide a tool so constructed that its operation may be controlled from the surface of the earth by the simple process of rotating the pipe string which is threadably or otherwise suitably secured to the tool.

Another object of the invention is to provide in a fishing tool of the character to be hereinafter described, a slip mandrel so arranged that damage to the slips is reduced to a minimum during the boring operation.

Stil another object is to provide a fishing tool wherein a screw jack is employed to effect operative contact between the tool and the pipe which is to be withdrawn from the well.

Yet another object of the invention is to provide a fishing spear which may be readily assembled and disassembled, and which may be fabricated at a minimum of cost.

Figure 1:
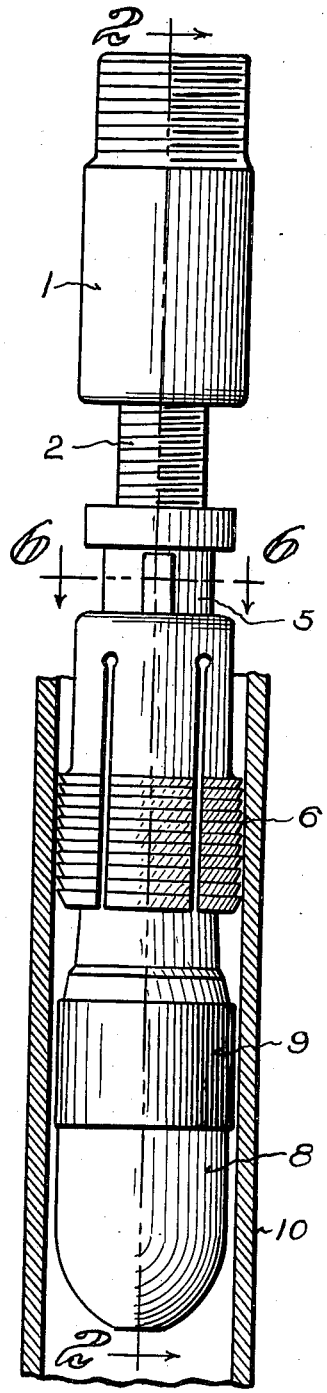
Figure 3:
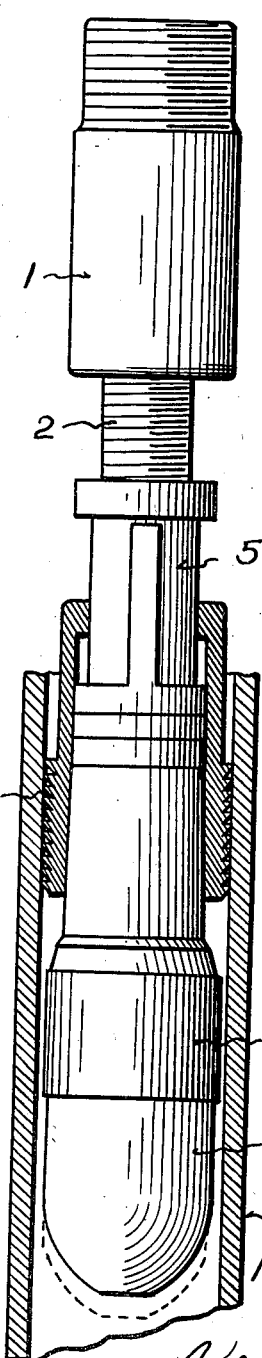
Figure 6:
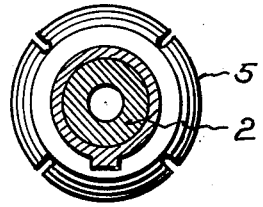
Figure 7:
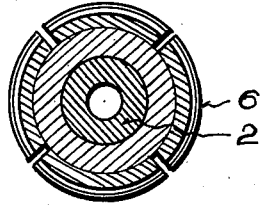
Figure 8:
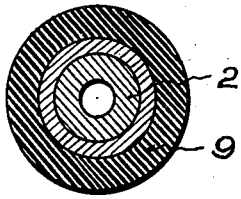
Figure 2:
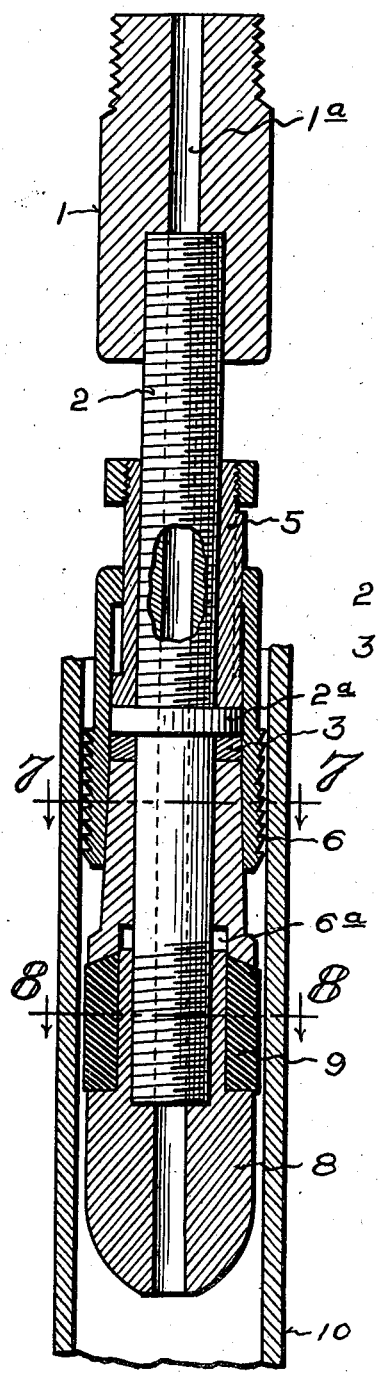
Figure 4:
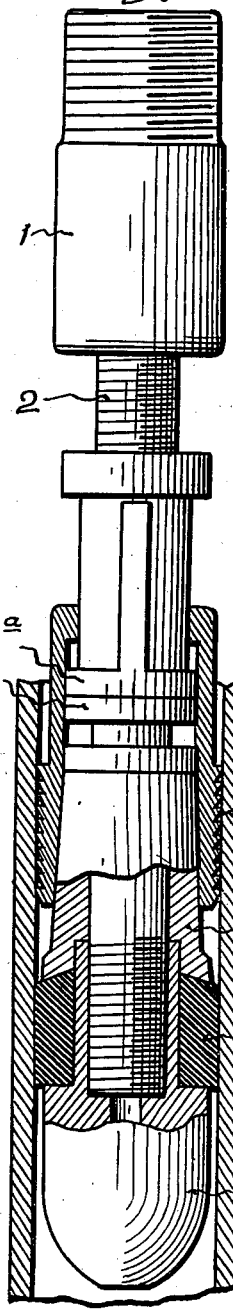
Figure 5:
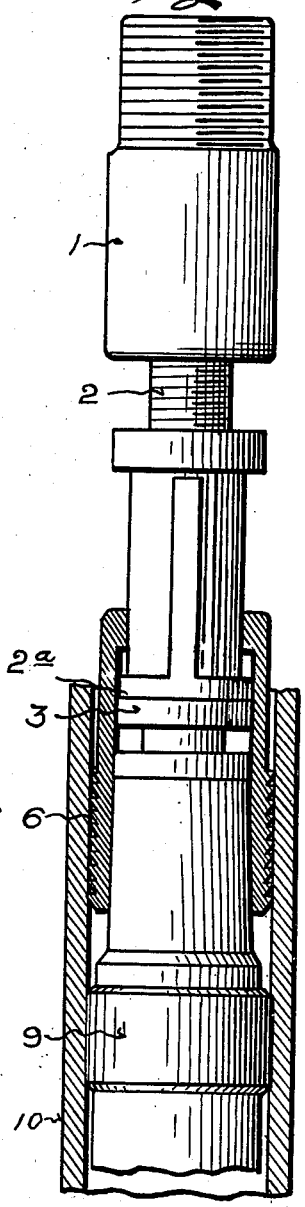

With the foregoing objects as paramount, the invention has particular reference to its salient features of construction, and inter-arrangement of parts which will become manifest as the description proceeds taken in connection with the accompanying drawings, wherein, Figure 1 is a view in vertical elevation showing the fishing tool in a lowered position prior to its operation for withdrawing a lost casing or other bore hole pipe, Figure 2 is a view of the invention shown vertically in cross section, Figure 3 is an elevational view showing the slips in engaged relationship with a pipe or well casing, Figure 4 is an elevational view shown partly in cross-section and with the packer in expanded position, Figure 5 is a fragmentary view showing the slips in engaged relationship with a casing, Figure 6 is a view taken on the line 6—6 on Figure 1, Figure 7 is a view taken on the line 7—7 on Figure 2 and Figure 8 is a view taken on line 8—8 on Figure 2.

Heretofore, considerable difficulty has been experienced due to the fact that an hydraulic pressure has been exerted against the exterior of the casing to be pulled and the casing has often been locked within the well, particularly when the bore hole has been drilled other than vertically, or when certain conditions have been encountered, for example in certain sections of Texas. The present invention provides a fishing tool by means of which lost pipe or casing may be retrieved under the most adverse of conditions, such as those above described. An axial water course is provided through which a liquid circulation may be maintained, the tool being provided with a packer to seal off undesired upward liquid flow around the tool. By means of this arrangement liquid pressure and consequent circulation may be obtained downwardly through the operating tool string, thence through the tool downwardly through the casing to be withdrawn and thence upwardly around the exterior of the pipe or casing. Obviously, this will result in the flushing away of earth deposits which would ordinarily tend to lock the casing within the bore hole.

The present invention moreover provides a screw-jack means whereby movement of the slips may be effected by rotation of the drill stem and a high mechanical advantage results to effect movement of the slips over a tapered mandrel.

Referring to the drawings the reference numeral 1 denotes a collar which is threadably connected to a drill stem (not shown). A water course 1a is provided as shown in Figure 2.

The reference numeral 2 denotes a mandrel, an integral part of the fishing tool which is threadably arranged as shown. A thrust collar 2a is preferably made integral with the central portion 2. This collar 2a is arranged to set down against a thrust bearing 3 which surrounds the mandrel 2 as shown in Figures 2 and 5.

There is a guiding portion 8 located at the lower end of the mandrel 2 and the mandrel 2 has a threaded connection with the guiding portion 8. The upper end of the guiding portion 8 has reduced portion and a packer element 9 is positioned in the reduced portion of the guiding portion. A slip mandrel 4 is mounted on the mandrel 2 between the packer element 9 and the thrust bearing 3. The slip mandrel has its outer surface tapered. At the lower end of the slip mandrel 4 and adjacent the packer 9 there is provided a recess or counterbore 6a.

Adjacent the upper portion of the mandrel 2 is a releasing nut mechanism 5 having threaded connection with the said mandrel 2. There is a collar secured to the upper end of the releasing nut mechanism 5, and a collar or annular rib is formed integrally with the releasing nut mechanism 5 at its lower end. There are slips or expansible jaws 6 which are united integrally with a ring at the upper end of the slips and the slips have slots therebetween, see Figure 1. The integral ring of the slips or expansible jaws 6 closely surrounds the releasing nut mechanism 5. The inner faces of the jaws 6 are adapted to fit over the tapering portion of the slip mandrel 4 and their outer surfaces are toothed. The releasing nut mechanism 5 has a key thereon, see Figure 2, and the key fits into a keyway cut in the ring of the expansible jaws 6.

The fishing tool is attached to a drill stem and is adapted to be inserted in a well bore to engage the broken pipe 10 stuck in the well bore. After the tool has been set in operative position, it can be lowered into the well bore to engage the broken pipe 10. The tool is arranged in operative position when the releasing nut mechanism 5 is screwed down on the mandrel 2 until the collar on the lower end of the releasing nut mechanism 5 engages or substantially engages the collar 2a on the mandrel 2. When the nut releasing mechanism is in such a position on the mandrel 2, the slips 6 engage the slip mandrel 4. As the tool is lowered into the well bore and engages the broken pipe 10, the slip means 6 moves upwardly on the nut releasing mechanism until the ring member of the slips 6 engages the shoulder on the nut releasing mechanism and thus the slips 6 do not wedge on the slip mandrel 4.

Now the broken pipe 10 is ready to be raised from the well bore, and the drill stem and tool are pulled upwardly, and the weight of the broken pipe 10 pulls downwardly on the slips 6 and wedges the slips 6 over the slip mandrel and also wedges the teeth of the slips into the pipe 10, and a firm connection is thus established between the tool and the broken pipe. The weight of the broken pipe 10 forces the slips 6 downwardly against the slip mandrel 4 and the slip mandrel bearing against the packer element 9 expands it into contact with the broken pipe 10. If the pipe 10 is found to be embedded in the well bore and difficult to pull out, then at this time fluid from the earth's surface can be fed down through the drill stem, then through the passages in the fishing tool into the broken pipe. This pumping of fluid into the well bore can be used to loosen debris around the broken pipe and flow it to the surface of the earth so that the pipe can be removed from the well bore.

If it is found impossible to pull the broken pipe 10 from the well bore, then said fishing tool can be released very easily. Then the drill stem by any suitable means on the surface of the earth is rotated to the right and also the mandrel 2 of the tool is rotated to the right at the same time and its integral collar 2a is forced downwardly to engage the thrust bearing 3. As the mandrel 2 is rotated to the right and downwardly, the nut releasing means 5 is carried upwardly on the mandrel 2 until the collar on its lower end engages the shoulder on the slip collar, and if rotation of mandrel 2 is continued to the right, and the slips 6 being wedged into the pipe 10 which is stuck in the well bore, it is almost impossible to move the releasing nut means 5 and slips 6 farther upwardly, so that mandrel 2 on further rotation to the right is moved downwardly through the immovable nut releasing means and the slip 6 mounted thereon, and the collar 2a forces the thrust bearing 3 and the slip mandrel 4 downwardly until the wedged engagement between the slips 6 and the slip mandrel 4 is released. The collar on the lower end of the nut releasing means 5 engaging the shoulder on the slip collar holds the slips 6 out of engagement with the slip mandrel 4. Now the tool is disengaged from the pipe 10, and can be withdrawn from the well bore. The key on the nut releasing means rides in the keyway of the ring member of the expansible jaws 6 and prevents the nut releasing means from turning when the mandrel 2 is screwed downwardly to release the slip mandrel 4 from the expansible jaws 6.

Manifestly the construction shown is capable of considerable modification and such modification as is considered within the scope of the appended claims is likewise considered within the spirit and intent of the invention.

What is claimed is:

1. In a device of the character described, a shaft mandrel having a collar intermediate its ends, a guide portion attached to the lower end of said mandrel, a slip mandrel means loosely surrounding the shaft mandrel, a nut releasing means threadedly connected to the upper portion of the shaft mandrel, expansible jaws in operable relation with the nut releasing means and the lower end of the expansible jaws engaging the slip mandrel, the shaft mandrel adapted to be rotated until its intermediate collar member engages the slip mandrel means and forces said slip mandrel means out of engagement with the said expansible jaws.

2. In a device of the character described, a shaft mandrel having a collar intermediate its ends, a guide portion attached to the lower end of said mandrel, a packing element spaced above said guide portion, a tapered slip mandrel loosely surrounding the shaft mandrel, a thrust bearing spaced between the collar on the shaft mandrel and the slip mandrel, a nut releasing means threadedly connected to the upper portion of the shaft mandrel, expansible jaws being in operable relation with the nut releasing means and the lower end of the expansible jaws adapted to operably engage the slip mandrel, the shaft mandrel adapted to be rotated until its intermediate collar member engages the thrust bearing and forces said slip mandrel out of engagement with the said expansible jaws.

3. In a device of the character described, a shaft mandrel having a collar intermediate its ends, a guide portion attached to the lower end of said mandrel, a slip mandrel surrounding the shaft mandrel, a nut releasing means threadedly connected to the upper portion of the shaft mandrel, expansible jaws in operable relation with the nut releasing means, and the lower end of the expansible jaws engaging the slip mandrel, the shaft mandrel adapted to be rotated until its intermediate collar member engages the slip mandrel and forces said slip mandrel out of engagement with said expansible jaws, and the releasing nut carried upwardly on the shaft mandrel as the intermediate collar is moved downwardly to engage the slip mandrel so that the expansible jaws are held out of operable engagement with the slip mandrel after the slip mandrel has been forced out of engagement with the expansible jaws.

FRANKLIN L. LE BUS.